Sept. 20, 1960           J. W. HALEY           2,953,392
CANTILEVER SPRING SUSPENSION FOR TANDEM WHEEL TRAILER
Filed Jan. 19, 1959           3 Sheets-Sheet 2

INVENTOR
John W. Haley

BY Diggins & Le Blanc
ATTORNEYS

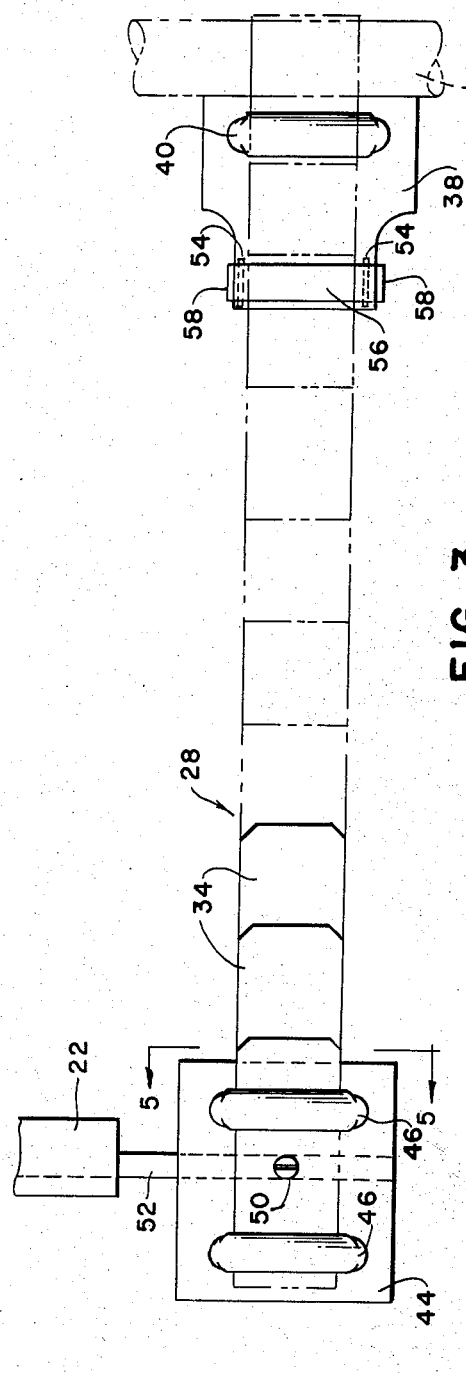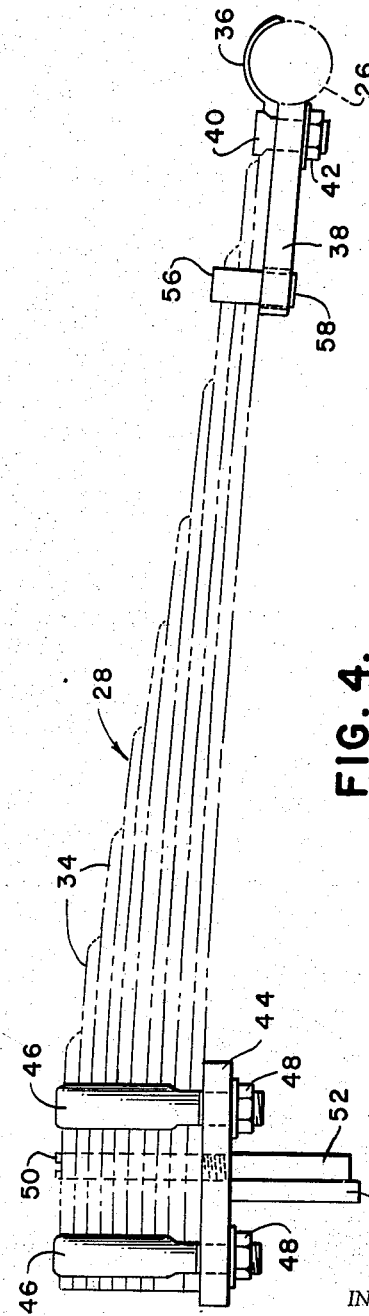

United States Patent Office 2,953,392
Patented Sept. 20, 1960

2,953,392

CANTILEVER SPRING SUSPENSION FOR TANDEM WHEEL TRAILER

John W. Haley, Eldorado, Tex.

Filed Jan. 19, 1959, Ser. No. 787,454

3 Claims. (Cl. 280—124)

This invention relates to suspension systems for vehicles and in particular relates to an improved suspension system for a tandem wheel trailer.

Suspension systems for tandem wheel trailers in the past have suffered from two major disadvantages and defects. For one thing, they have been subject to too much bounce when being pulled over rough terrain and, for another, they have exhibited too much sway or lateral play under similar circumstances. Two major factors contribute to the foregoing shortcomings. One has been the fact that the center of gravity of the suspension system has been too high and the other stems from the fact that only a single suspension system was employed.

According to the present invention I have found that a greatly improved suspension system for tandem wheel trailers may be effected by using a twin suspension system with each system associated with one pair of wheels and further by providing each suspension system with a low center of gravity. Thus it is possible in the trailer suspension of the present invention to have one suspension assembly interacting with and offsetting another suspension assembly. I have further found it to be desirable to have a suspension system which has a variable damping effect consistent with the magnitude of the torques encountered.

Accordingly, it is an object of the present invention to provide a novel suspension system for a tandem wheel trailer utilizing an individual suspension associated with each pair of wheels.

It is another object of the present invention to provide a twin suspension assembly in which one assembly will counterbalance the other.

It is another object of the present invention to provide a novel suspension system for a tandem wheel trailer in which there are no movable parts other than the springs utilized.

It is another object of the present invention to provide for resilient clamping of the spring members of the suspension system that will permit differential damping for varying torques.

It is still another object of the present invention to provide a suspension system for a tandem wheel trailer that is rigid with respect to laterally directed torques to minimize the sway of the trailer.

These and further objects and advantages of the present invention shall become more apparent upon reference to the following specification and claims and appended drawings wherein:

Figure 3 is a plan view of a single suspension element;

Figure 4 is a front view of Figure 3; and

Figure 1:
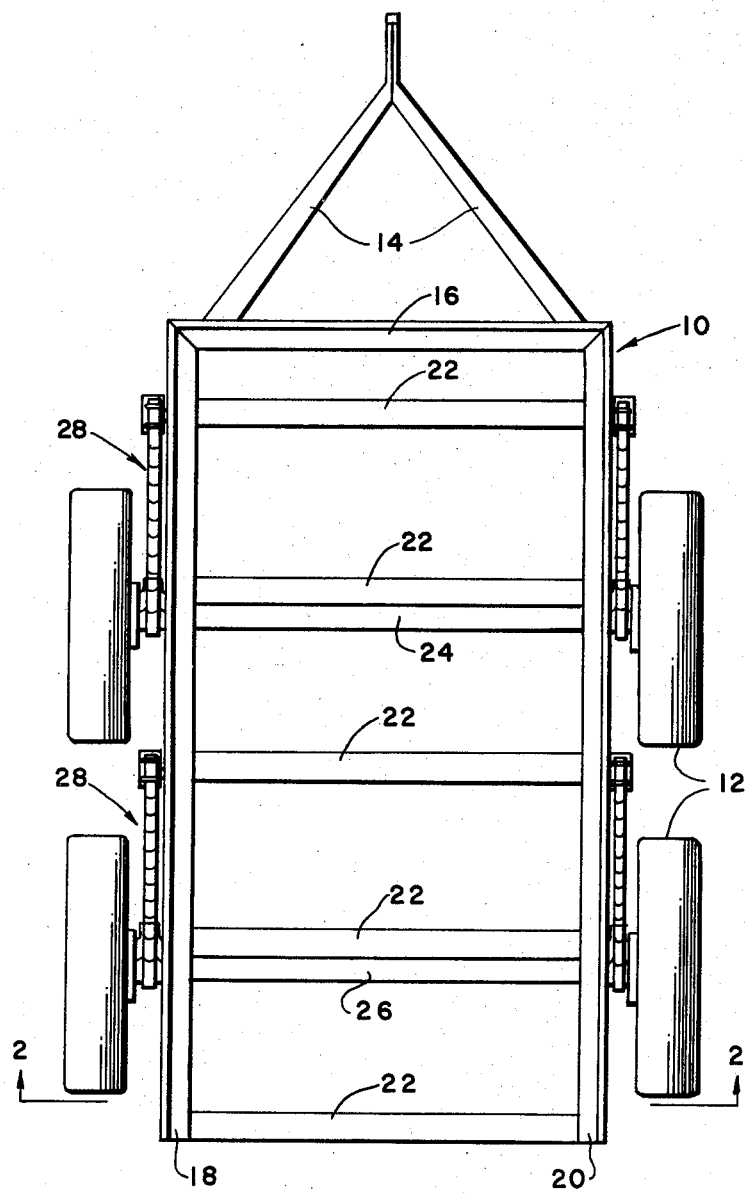
Figure 1 is a plan view showing the general relationship of the suspension means with respect to the trailer frame.

Referring now to Figure 1, there is shown a trailer frame indicated generally at 10 having two pairs of tandem wheels 12 arranged on either side thereof. The trailer frame 10 is generally an A-type frame consisting of drawbars 14, transverse front cross frame member 16 and side frame members 18 and 20. The frame 10 is also provided with a series of transverse stabilizing members 22 which are preferably angle irons and which parallel cross frame member 16. Front and rear stationary axles are provided at 24 and 26 respectively for a purpose that will become apparent hereinafter. Two pairs of spring suspension members are indicated generally at 28, the nature of which will also become more apparent hereinafter.

Figure 2:
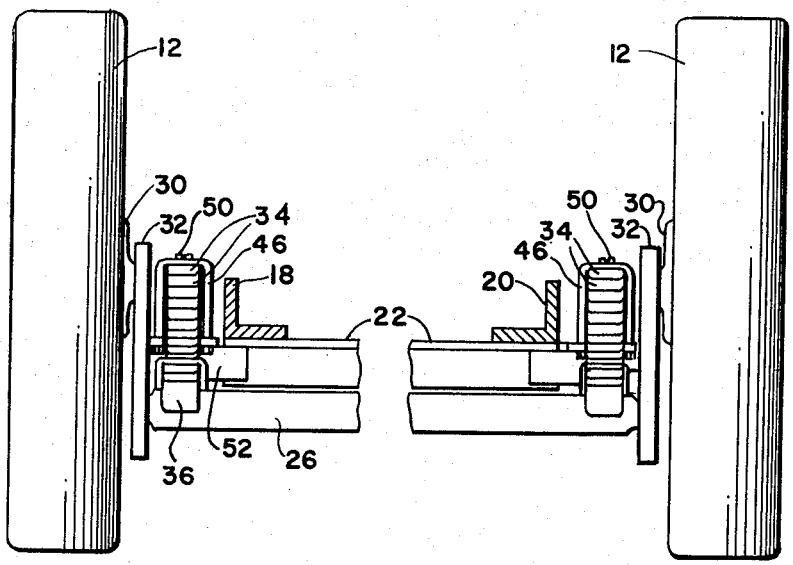
Figure 2 is a sectional end view taken along the lines 2—2 of Figure 1.

Referring now to Figure 2, tandem wheels 12 are journalled for rotation in stationary hubs 30 which carry on the inner ends thereof suspension bars 32. The front and rear stationary axles 24 and 26 are fixedly attached to the lower portions of suspension bars 32 below the axis of rotation of tandem wheels 12. As can be seen in this figure, the spring suspension members 28 consist of a plurality of cantilever springs or half springs 34 which extend downwardly toward the stationary axles of which rear stationary axle 26 is shown in Figure 2.

Referring now to Figures 2 through 5, it will be seen that the spring suspension members 28 consist of a stack of cantilever springs 34 in overlying contiguous relation. The cantilever springs 34 are of different lengths and they decrease in length from the bottom of the stack to the top in each spring suspension member 28. Furthermore, it will be seen that the cantilever springs 34 are aligned at their forward end and that when the cantilever spring reaches the rear shaft 26 it is composed of a single cantilever spring. The lowermost cantilever spring is provided with an arcuate portion 36 which loosely overlies the stationary axle indicated at 26 in Figures 3 and 4. Adjacent each stationary axle is positioned a rear support plate 38 through which pass the legs of a single U-bolt 40 which is secured by nuts 42. The U-bolt 40 is welded to the top side of the lowermost cantilever spring adjacent its arcuate portion 36.

In similar fashion, a front support plate 44 is positioned beneath the lowermost cantilever spring of the spring suspension member 28 through which extends the legs of a pair of U-bolts 46 which are secured by nuts 48. The U-bolts 46 are welded to the uppermost cantilever spring and supply a rigid support for this end of the spring suspension member 28.

Figure 5:
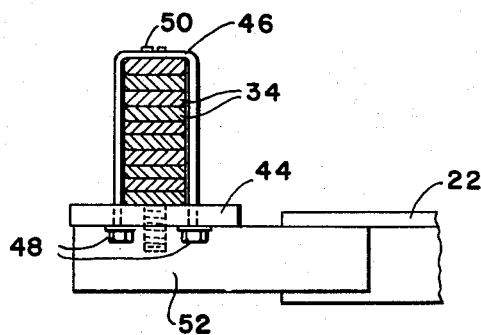
Figure 5 is a sectional end view taken along the lines 5—5 of Figure 3.

Referring now to Figures 3–5, the manner in which the front end of the suspension system is attached to the frame will now be explained. A screw 50 is passed through the ends of cantilever springs 34 between the U-bolts 46 and parallel to the legs thereof extending through the front support plate 44 and threadedly engages a hanger plate 52. Hanger plate 52 extends laterally of the front support plate 44 and is flush with a depending leg of a transverse stabilizing member 22. Hanger plate 52 is secured to the transverse stabilizing member 22 by any suitable manner, such as by welding.

Referring once again to Figures 3 and 4, the rear support plate 38 is shown slotted at 54 to receive the legs of a resilient clip member 56 which is shown overlying three of the cantilever springs 34. The legs of the resilient clip member 56 extend downwardly through the slots 54 and outwardly as at 58.

In the embodiment shown, the flexible clip 56 permits the bottom three cantilever springs to respond as though they were substantially the same length at low impact torques but provide a differential effective length at high torques. For example, at low torques, a vertical component imparted to the springs 34 through stationary axles 24 or 26 will not be sufficient to cause the spring clip 56 to yield at its uppermost position and the three bottom springs of the spring suspension member 28 will be caused to oscillate substantially in unison both upwardly and downwardly. Thus, both the period of oscillation and the amplitude of oscillation will be substantially the same for the three bottom springs. However, at a predetermined higher torque the spring clip will yield slightly at the top of its upward stroke causing a slight separation of the three lowermost cantilever springs so as to provide them with both a variable amplitude and a variable period of oscillation at high torques. It will be apparent that the thickness of spring clip 56, the manner in which it is attached to rear support plate 38 and the number of springs enveloped will be determinative of the upper torque at which the spring clip 56 will yield. In this regard, the present embodiment is deemed to be merely illustrative of this facet of the invention.

An additional advantage of the suspension system of the present invention is that each pair of half-springs or cantilever springs 34 works independently of and out of phase with the other pair of springs. In the course of pulling the trailer the situation develops wherein one pair of springs counteracts the other pair and holds the bounce of the trailer to a minimum. The system is highly resistant to the transmission of torques in a lateral direction. This is true not only because of the construction of the frame itself, but also because of the front and rear stationary axles 24 and 26 which effectively damp the transmission of lateral torques and the position of the cantilever springs 34.

It will be appreciated from the foregoing that the suspension system of this invention, through twin suspensions having both a variable amplitude and period of oscillation, is capable of minimizing both bounce and lateral play. The system permits differential damping for varying torques and utilizes no movable parts other than the springs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A suspension system for a tandem wheel trailer including a frame and two pairs of wheels arranged in tandem on either side of said frame, a stationary axle associated with each pair of tandem wheels, means for suspending each stationary axle below the axis of rotation of said wheels, a pair of spring members contacting each stationary axle at one end of said spring members, each of said spring members consisting of a stack of cantilever springs in overlying contiguous relation, said cantilever springs being of different lengths decreasing in length from the bottom to the top of each spring member, said spring members extending upwardly and forwardly from each stationary axle toward said frame, the ends of said cantilever springs being in substantial alignment at the forward end, a pair of U-bolts anchoring said cantilever springs at the forward end, means for securing the forward end of said spring members to said frame, a single U-bolt overlying the lowermost cantilever spring adjacent said stationary axle, and resilient means between said pair of U-bolts and said single U-bolt for holding some but not all of said cantilever springs together until a predetermined torque is imparted to a stationary axle.

2. A suspension system for a tandem wheel trailer including a frame and two pairs of wheels arranged in tandem on either side of said frame, a stationary axle associated with each pair of tandem wheels, means for suspending each stationary axle below the axis of rotation of said wheels, a pair of spring members contacting each stationary axle at one end of said spring members, each of said spring members consisting of a stack of cantilever springs in overlying contiguous relation, said cantilever springs being of different lengths decreasing in length from the bottom to the top of each spring member, said spring members extending upwardly and forwardly from each stationary axle toward said frame, the ends of said cantilever springs being in substantial alignment at the forward end, a front support member underlying the forward end of the lowermost cantilever spring, a pair of U-bolts welded to the uppermost cantilever spring and having legs extending through and secured to said support member, a rear support member underlying the rearward end of the lowermost cantilever spring, a single U-bolt welded to the top of the lowermost cantilever spring extending through and secured to said rear support member, and resilient means between said pair of U-bolts and said single U-bolt for holding some but not all of said cantilever springs together until a predetermined torque is imparted to one of said stationary axles.

3. A suspension system for a tandem wheel trailer as set out in claim 2 wherein said resilient means is a U-shaped clip the legs of which are releasably held by said rear support member.

References Cited in the file of this patent

UNITED STATES PATENTS

| | | |
|---|---|---|
| 933,977 | Lieb | Sept. 14, 1909 |
| 1,166,616 | Mason | Jan. 4, 1916 |
| 2,689,015 | Nallinger | Sept. 14, 1954 |